March 30, 1954  D. PACKARD  2,673,963
ULTRAHIGH-FREQUENCY MEASURING APPARATUS
Filed Nov. 5, 1951  2 Sheets-Sheet 1
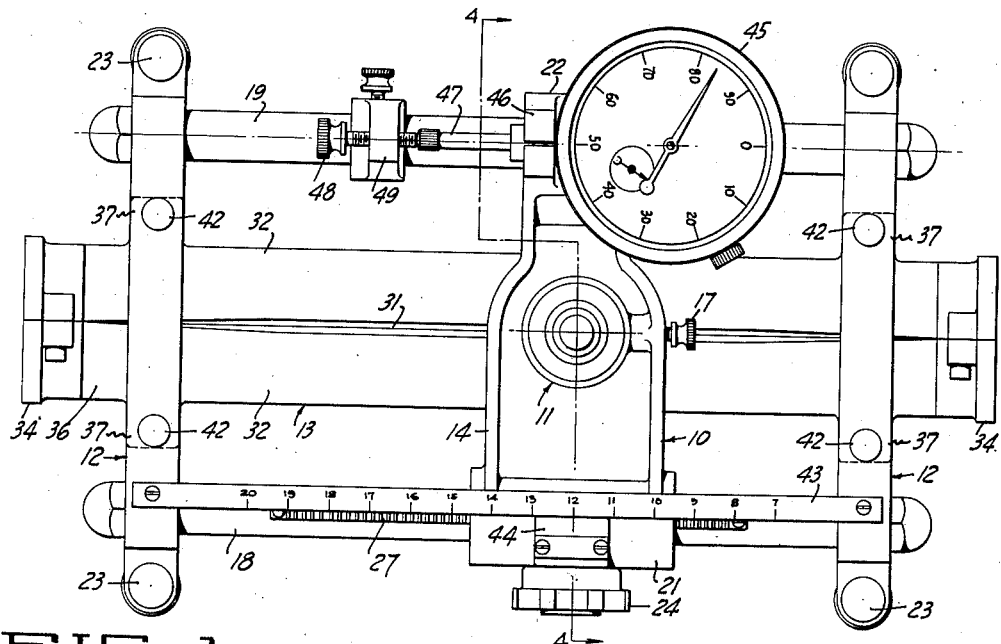
FIG_1_
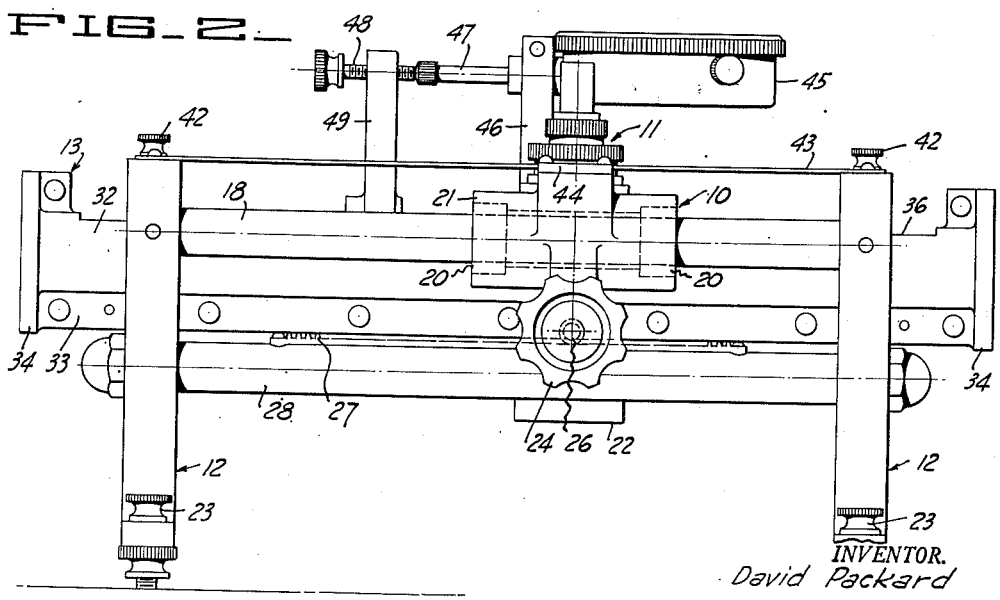
FIG_2_
INVENTOR.
David Packard
BY
ATTORNEYS

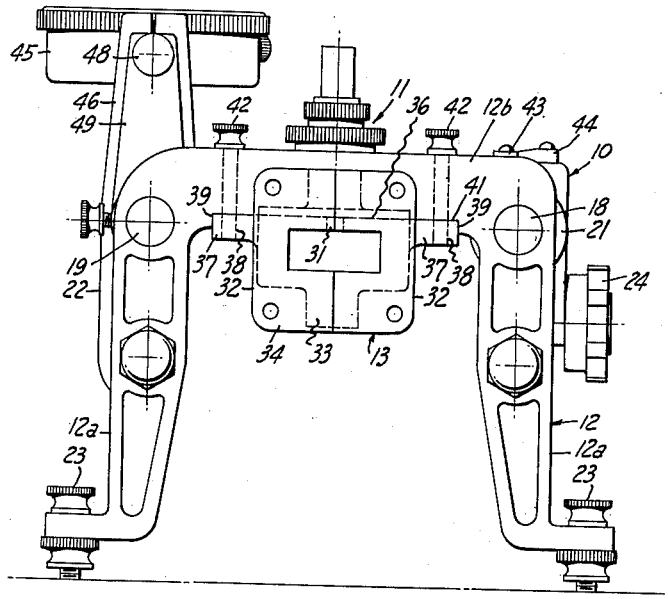
FIG_3_
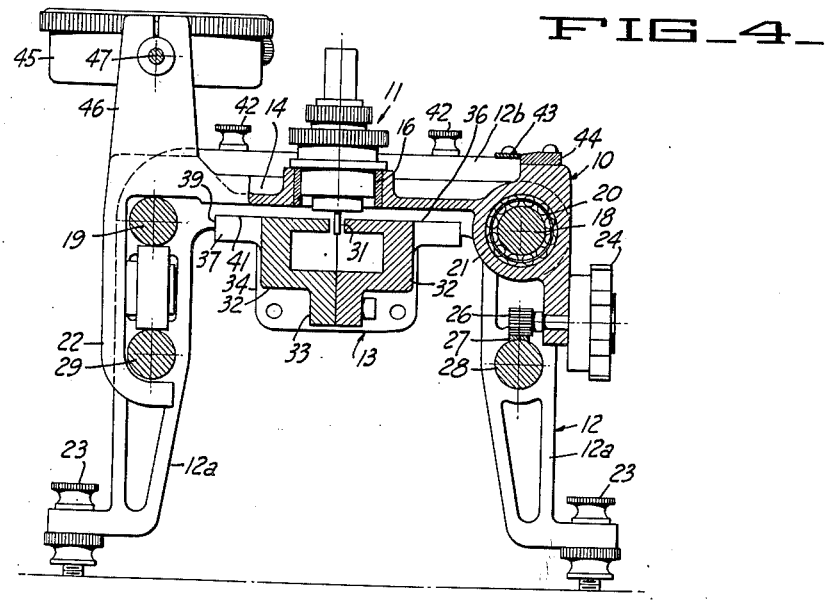
FIG_4_

Patented Mar. 30, 1954

2,673,963

UNITED STATES PATENT OFFICE 2,673,963

ULTRAHIGH-FREQUENCY MEASURING APPARATUS

David Packard, Los Altos, Calif., assignor to Hewlett-Packard Company, Palo Alto, Calif., a corporation of California Application November 5, 1951, Serial No. 254,945

2 Claims. (Cl. 333—98)

This invention relates generally to ultrahigh frequency electrical measuring apparatus and more particularly to apparatus known in the art as standing wave detectors.

Standing wave detectors customarily employ a high frequency transmission line provided with a slotted outer conductor. A probe or like pickup device is adapted to extend into the slot and is supported by a suitable carriage, whereby it is movable lengthwise of the transmission line. Suitable electronic equipment is connected to the probe to enable making standing wave and impedance measurements. The outer slotted conductor of the transmission line may be the outer tubular conductor of a coaxial line, or the tubular wall of a wave guide. A characteristic of prior equipment of this character is that the outer conductor is integrally or permanently attached to means which serves to support and track the carriage. A given piece of equipment is therefore constructed to operate with a transmission line of certain electrical characteristics. This limits the range of usefulness of the apparatus, whereby many separate pieces of equipment are required where testing is to be carried out over a wide range of frequencies.

It is an object of the present invention to provide simplified apparatus of the above character which will make possible application to a wide frequency range.

Another object of the invention is to provide a novel mechanical structure for equipment of the above character whereby transmission line sections of different sizes and electrical characteristics can be quickly applied or exchanged, to thereby adapt the equipment to various frequency bands.

Additional objects and features of the invention will appear from the following description in which the preferred embodiment has been set forth in detail in conjunction with the accompanying drawing.

Referring to the drawing:

Figure 1 is a plan view illustrating apparatus incorporated in the present invention.

Figure 2 is a side elevational view of the apparatus shown in Figure 1.

Figure 3 is an end view of the apparatus.

Figure 4 is a cross-sectional view taken along the line 4—4 of Figure 1.

The apparatus illustrated in the drawing consists generally of a carriage 10 adapted to have rectilinear movement in opposite directions, and which serves to detachably mount a suitable pickup device or probe 11. The tracking means for the carriage is secured to the members 12, which form means for detachably mounting the transmission line section 13 in cooperative relation with the probe and carriage.

In the specific construction illustrated, the carriage consists of a body part 14 that is provided with the central opening 16 for removably accommodating the probe 11. The probe is removably retained by suitable means such as the set screw 17. The carriage is tracked upon the parallel guide rods 18 and 19, which have their ends secured to the members 12. In order to provide tracking to a high degree of accuracy and a minimum amount of friction, it is desirable to provide ball-bearing bushings 20 of the linear type which are fitted within the forward and rear portions 21 and 22 of the carriage, and which embrace and slide along the rods 18 and 19.

The mounting members 12 are formed U-shaped, or in other words they are in the form of inverted saddles. The legs or side branches 12a of these members are shown provided with leveling screws 23, to facilitate supporting the apparatus in a desired horizontal position.

The means illustrated for manually moving the carriage includes a shaft which is journaled to the carriage, and to which the knob 24 and pinion 26 are attached. The pinion engages a gear rack 27, which is formed on the rod 28. Rod 28, together with a similar rod 29 at the rear side of the apparatus, extend between and are secured at their extremities to the members 12.

The ultrahigh frequency wave guide section 13 illustrated in Figure 1 has its one side wall provided with longitudinal slot 31. In the particular construction illustrated the body of the wave guide is formed of two halves 32, which are duplicates, and which are machined to form the longitudinal slot 31. The two halves are accurately secured together as by means of the lower meeting flanges 33 and the end coupling flanges 34. The flanges 34 provide means for making connection with other portions or sections of a complete transmission system.

The means provided for accurately locating a wave guide section 13 with respect to the carriage is as follows: The upper face 36 of the wave guide section is accurately machined to form a true planar surface. Laterally extending lugs or ears 37 are provided near the ends of the section, and are provided with threaded openings 38. The cross bars 12b of the mounting members 12 have downwardly faced pads 39, and the lower faces 41 of these pads are accurately machined to be in a common plane and to meet with the upper surfaces of the ears 37. Screws 42 are loosely accommodated in the members 12, and are adapted to be threaded into the openings 38, whereby the wave guide can be firmly clamped against the pads 39. This form of attaching means provides for highly accurate location of the wave guide section with respect to the carriage and the probe, and in addition it enables a particular guide to be readily removed, and another guide of different size applied.

In making highly accurate measurements it is desirable to use various types of indicating means to indicate the position of the carriage. Thus a calibrated strip 43 is attached to the members 12, and extends in proximity with the carriage. The carriage has a vernier calibrated strip 44 which is located in proximity with the strip 43. As additional indicating means, I can employ a dial indicator 45 of the micrometer type, which can be movably secured to the supporting post 46 on the carriage. The operating member 47 of the dial indicator can abut a zero adjustment screw 48, which is carried by the stationary support post 49. By the use of such a dial indicator it is possible to indicate the position of the carriage to a high degree of accuracy.

Operation of the apparatus described above is as follows: Depending upon the frequency range desired, a wave guide or coaxial section is attached to the mounting members 12, with its coupling slot 31 in cooperative relation with the probe 11. The ends of the wave guide or transmission line section are then connected to additional sections of a complete system. The probe 11 is connected to suitable electronic indicating or measuring equipment by suitable means such as a flexible cable. By virtue of the accurate positioning of the wave guide section, the pickup loop of the probe is accurately located within the slot 31, and is maintained in accurate alignment with the slot as the carriage and the probe are moved to different operating positions. By providing a plurality of transmission line sections of different sizes and electrical characteristics, the apparatus can be adapted to a wide overall range. Each such section is constructed with machined attaching lugs corresponding to the lugs 37, and the distance between centers of the tapped openings 38 is the same for each section, whereby all of the sections can be replaceably mounted upon the members 12. For a frequency range of say from 10 to 4000 megacycles, two sections can be provided of the coaxial type, with the outer conductor being slotted and constructed to provide mounting means in the manner described above. For frequencies ranging from say 2600 to 13,000 megacycles, transmission line sections of the wave guide type can be employed with the mounting means of each section being the same.

It will be evident from the foregoing that the invention greatly extends the useful range of application of standing wave detectors. The apparatus has a high degree of accuracy for a selected frequency band, and the same degree of accuracy can be maintained for selected frequency bands over a wide range. A minimum amount of time is required for adapting the apparatus to different selected frequency bands, and a minimum amount of equipment is required to take measurements over a wide frequency range. Because of the novel construction of the mounting means, including particularly the saddle-like members 12, it is possible in many instances to apply the apparatus to a transmission line section which has previously been connected in a transmission system, without the necessity of first removing a section, before the apparatus is applied. In other words, it is possible to place the apparatus over a wave guide section and engage the screws 42 to effect accurate positioning between the carriage and the wave guide section, without disconnecting the ends of the wave guide section from adjacent sections.

I claim:

1. In ultrahigh frequency electrical apparatus for standing wave measurements, a carriage, a detector probe secured to the carriage, a pair of inverted U-shaped mounting members, each mounting member having depending side branches and an upper horizontal bar portion connecting the side branches, the side branches forming laterally spaced legs for supporting the apparatus, means connecting said mounting members for tracking the carriage whereby the carriage can be moved in opposite directions between the mounting members, downwardly faced pads formed on the lower sides of said connecting bars, the lower faces of the pads being in a common plane, a transmission line section positioned within said mounting members and including an outer slotted conductor, mounting ears formed on the outer conductor of the section and proportioned to meet said pads, with accurate location of the slotted conductor relative to the carriage, and releasable means for clamping the section against said pads.

2. In high frequency electrical apparatus for standing wave measurements, a carriage, a detector probe secured to the carriage, a pair of inverted U-shaped mounting members, each mounting member having spaced depending side branches, and an upper horizontal bar portion connecting the side branches, the branches forming spaced vertical legs for supporting the apparatus, means connecting the said mounting members for accurately tracking the carriage whereby the carriage can be traversed in opposite directions between the mounting members, downwardly faced pads formed on the lower sides of said connecting bars, the lower faces of said pads being in a common plane, a transmission line section capable of being transposed through the spacing between said legs to a position within said mounting members, said section including an outer conductor having a longitudinal probe accommodating slot in that side of the conductor that is faced toward the carriage, spaced upwardly faced mounting ears formed on said conductor and located generally on opposite sides of the slot therein, said ears being proportioned to meet said pads with accurate location of said line section relative to the carriage end probe, and releasable means for clamping said ears against said pads.

DAVID PACKARD.

References Cited in the file of this patent

UNITED STATES PATENTS

| Number | Name | Date |
|---|---|---|
| 2,454,042 | Dettinger | Nov. 16, 1948 |
| 2,551,398 | Sensiper | May 1, 1951 |